United States Patent [19]

Schumacher et al.

[11] 4,264,127
[45] Apr. 28, 1981

[54] OPTICAL DETECTOR ASSEMBLY AND METHOD

[75] Inventors: William L. Schumacher, Camp Hill; Russell H. Williams, Wormleysburg, both of Pa.

[73] Assignee: AMP Incorporated, Harrisburg, Pa.

[21] Appl. No.: 27,180

[22] Filed: Apr. 4, 1979

[51] Int. Cl.³ .............................. G02B 5/14; G02B 5/17
[52] U.S. Cl. ............................ 350/96.20; 350/96.26; 250/227
[58] Field of Search ............... 350/96.10, 96.15, 96.20, 350/96.21, 96.30, 96.26; 250/227

[56] References Cited

U.S. PATENT DOCUMENTS

| | | | |
|---|---|---|---|
| 3,417,234 | 12/1968 | Sundblad et al. | 235/61.11 |
| 3,430,057 | 2/1969 | Genähr | 250/227 |
| 3,786,238 | 1/1974 | Heisner | 250/227 |
| 3,868,514 | 2/1975 | Israelsson | 250/566 |
| 3,903,615 | 9/1975 | Dotsko | 356/96.20 X |
| 3,916,184 | 10/1975 | Turner et al. | 250/227 |
| 3,937,558 | 2/1976 | Mukai et al. | 250/227 X |
| 3,953,730 | 4/1976 | Henry et al. | 250/227 |
| 3,956,587 | 5/1976 | Nelson | 358/286 |
| 4,033,698 | 7/1977 | Demsky et al. | 356/173 |

*Primary Examiner*—John K. Corbin
*Assistant Examiner*—Rodney B. Bovernick
*Attorney, Agent, or Firm*—Richard B. O'Planick

[57] ABSTRACT

An optical detector assembly is disclosed for detecting light-dark variations in an encoded surface or the like. The assembly includes a resilient ferrule having a profiled bore for receiving a transmitting and a receiving optical waveguide therein in axially adjacent relationship and crimping means for radially compressing a nose portion of the ferrule around the waveguides holding the waveguides in closest proximity. End surfaces of the assembly waveguides and resilient ferrule are subsequently prepared at a common prescribed angle so that, upon normally positioning the detector assembly above the encoded surface, transmitted light is refracted at the transmitting waveguide end surface toward a relatively small detection zone of the encoded surface. The like-angled end surface of the receiving waveguide receives, with refraction, light reflected from the detection zone.

6 Claims, 13 Drawing Figures

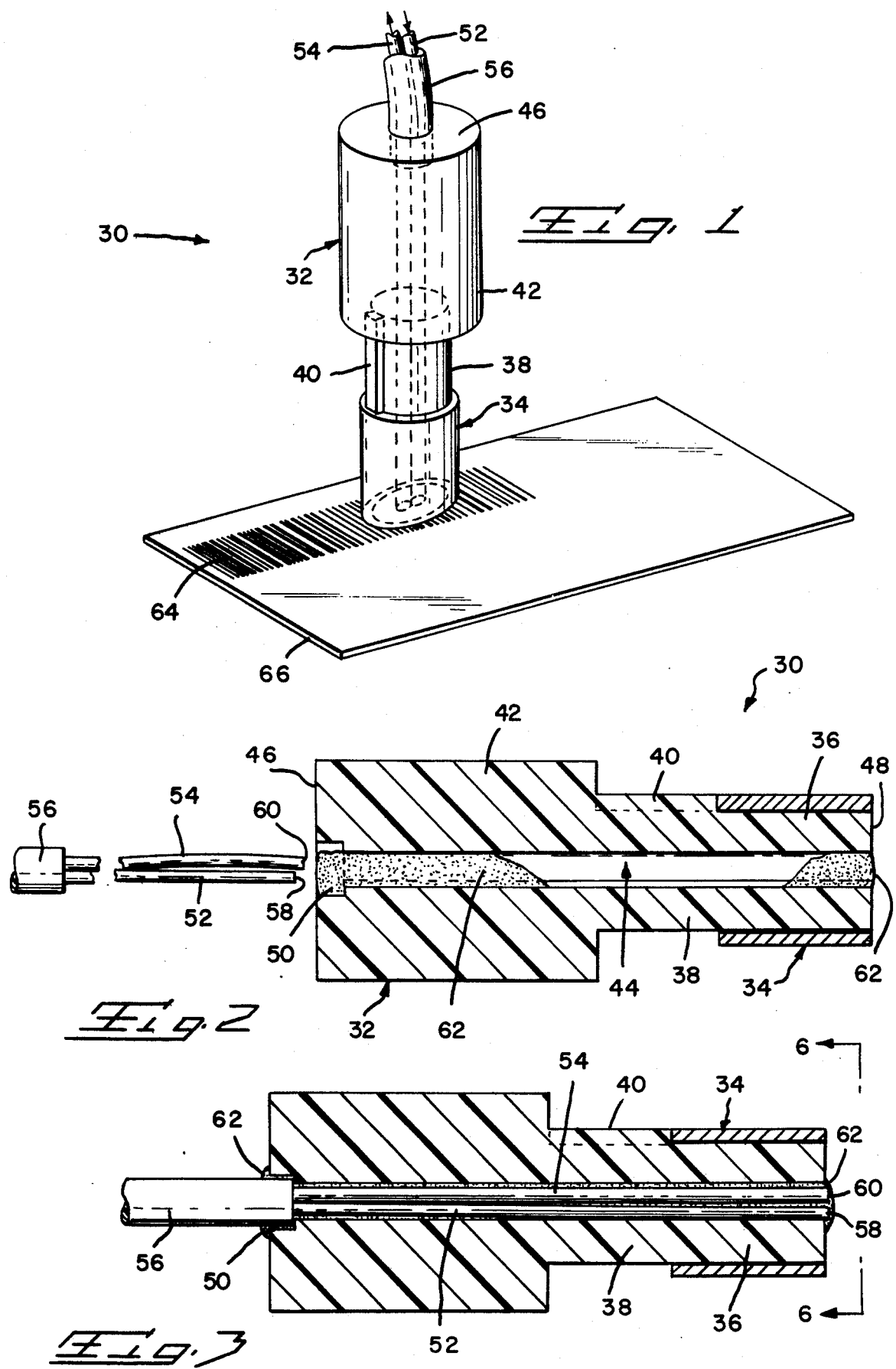

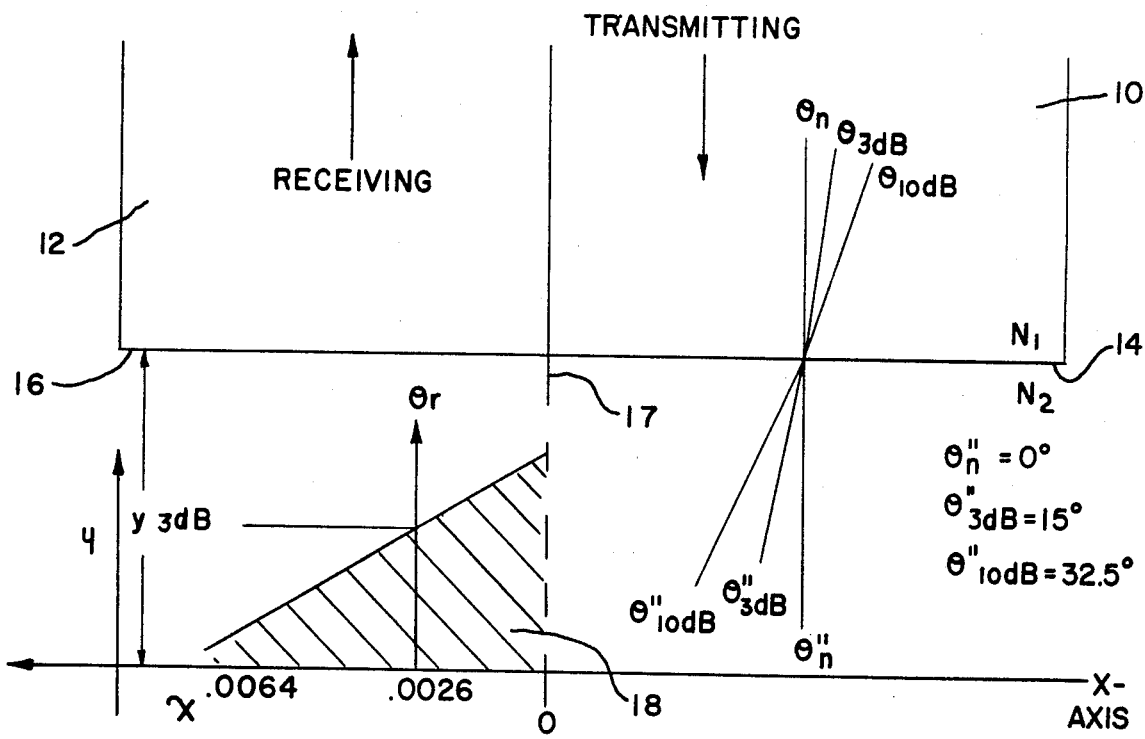
_Fig. 8_
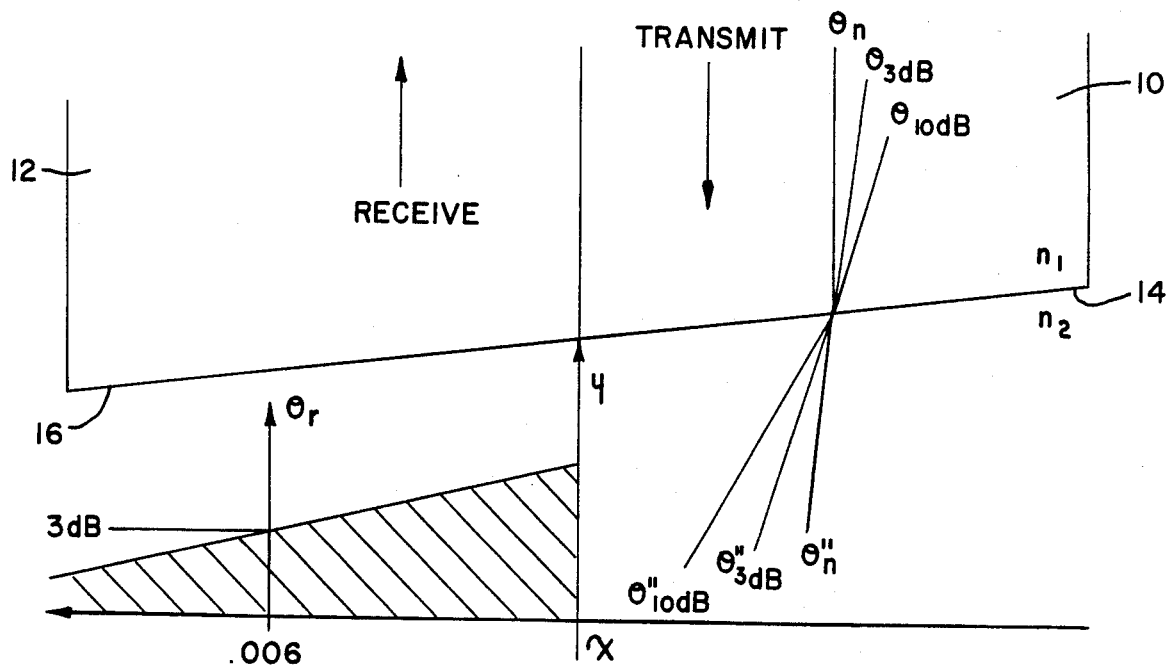
_Fig. 9_

MODEL 3
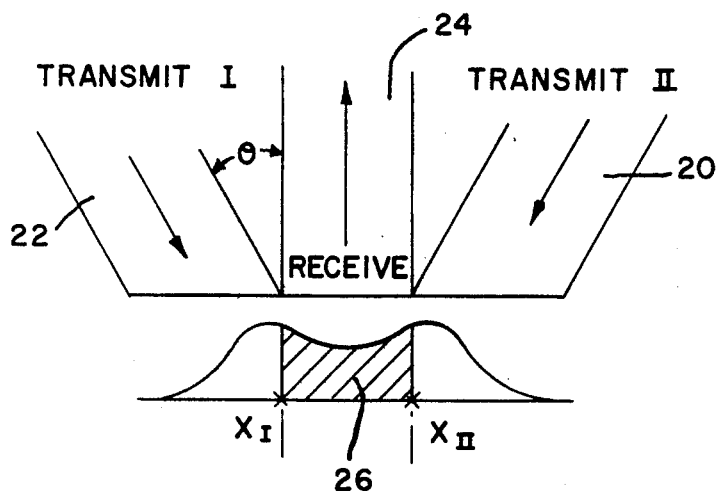
_Fig. 10_
MODEL 2
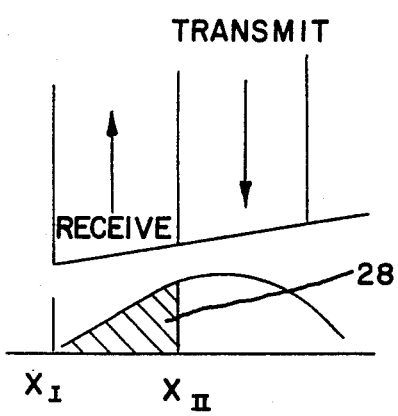
_Fig. 11_
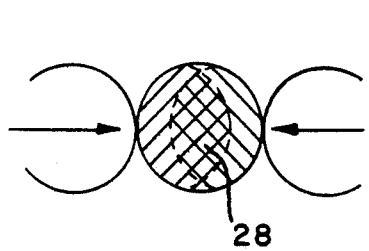
_Fig. 10A_
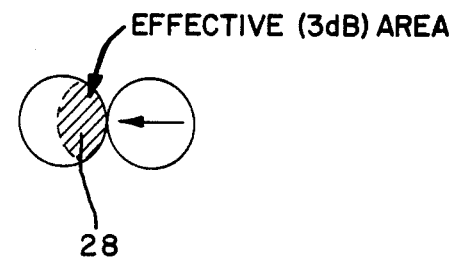
_Fig. 11A_

OPTICAL DETECTOR ASSEMBLY AND METHOD

BACKGROUND OF THE INVENTION

1. Field of the Invention

This invention relates generally to optical detector assemblies for discerning light-dark variations in a surface, and specifically to assemblies utilizing transmitting and receiving waveguides in accomplishing same.

2. Description of Prior Art

Optical detector assemblies for use in facsimile reproduction or the like are generally well-known in the art and typically comprise illuminating waveguide means for illuminating an encoded surface with light, and receiving waveguide means positioned to optimally detect reflected light from reflective areas of the encoded surface. Such optical detector assemblies are commonly incorporated in a light-pen type device intended for movement across the subject encoded surface, or mounted stationary in a fixture beneath which the encoded surface is regularly passed.

Achievement of an ideal optical detector assembly, however, has been illusive to the industry because of the heretofore irreconcilable optical performance and manufacturing demands placed on any proposed detector assembly. One problem in the construction of a satisfactory assembly is to provide sufficient illumination of the subject surface. The designers of optical detector assemblies have attempted to solve this problem by providing detector devices having multiple illuminating waveguides which flood a relatively large portion of the subject surface with transmitted light. An apparatus utilizing this approach is described in U.S. Pat. No. 4,033,698 and comprises a plurality of illuminating waveguides angularly referenced from a receiving waveguide. While this device works well in delivering sufficient illumination to the subject surface and has been well received by the industry, certain shortcomings prevent the apparatus from representing an ideal solution. One shortcoming is that illuminating a large area of the subject surface can negatively affect the resolution of the relatively small portion of that illuminated large area detected by the receiving waveguide. The degradation in resolution is a consequence of fringe illumination entering the receiving waveguide. Further, the manufacture of an optical detector apparatus having multiple illuminating waveguides is relatively difficult and therefore expensive, particularly if the illuminating waveguides are intended to be angularly referenced from the receiving waveguide for enhanced illumination of the subject surface.

SUMMARY OF THE INVENTION

The subject invention is embodied by an optical detector assembly comprising a single receiving optical waveguide, a single transmitting waveguide, a resilient ferrule having a profiled bore for receiving the waveguides therein, and a crimp ring for compressing a nose portion of the ferrule around the waveguides, holding the waveguides in closest proximity. Subsequent to assembly, forward surfaces of the waveguides and ferrule are simultaneously prepared to be coplanarly angled, with the end surface of the receiving waveguide extending forward from the coplanarly angled transmitting waveguide end surface. Light transmitted through the transmitting waveguide is, with refraction, directed toward a small detection zone of the surface image to be transferred beneath the receiving waveguide end surface. The receiving waveguide, having an end surface prepared at the same prescribed angle and being axially adjacent the transmitting waveguide, is thereby positively positioned to accept, with refraction, light reflected from the detection zone.

Accordingly, it is an object of the instant invention to provide an optical detector assembly which can optimally illuminate a detection zone on a work surface using one illuminating waveguide.

It is a further object to provide an optical detector assembly capable of directing transmitted light toward a relatively small detection zone on an encoded surface.

It is a further object to provide an optical detector assembly which comprises one illuminating waveguide and one receiving waveguide.

A still further object is to provide an optical detector assembly having receiving means adapted to limit detection of light reflected from outside a relatively small detection zone.

It is a still further object to provide an optical detector assembly which can be economically and readily produced, and readily assembled.

These and other objects which will be apparent to one skilled in the art are achieved by a preferred embodiment which is described in detail below, and which is illustrated in the accompanying drawings.

BRIEF DESCRIPTION OF THE DRAWINGS

FIG. 1 is a perspective view of the subject optical detector assembly positioned above an encoded surface.

FIG. 2 is a side elevation view in section of the subject optical detector assembly prior to insertion of the waveguides into the ferrule member.

FIG. 3 is a side elevation view in section of the subject optical detector assembly subsequent the insertion of the waveguides into the ferrule member.

FIG. 8 is a diagrammatic view of a two waveguide detector configuration.

FIG. 9 is a diagrammatic view of the subject two waveguide detector configuration.

FIG. 10 is a diagrammatic view of a three waveguide detector configuration.

FIG. 10A is a diagrammatic representation of the illumination dispersal of the detector of FIG. 10.

FIG. 11 is a diagrammatic view of the subject two waveguide detector assembly.

FIG. 11A is a diagrammatic representation of the illumination dispersal of the detector of FIG. 11.

DESCRIPTION OF THE PREFERRED EMBODIMENT

Figure 4:
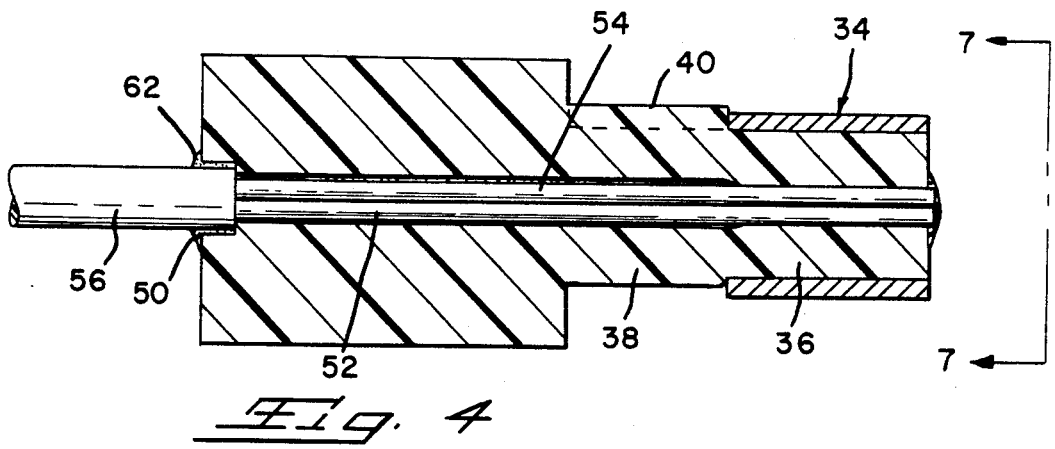
FIG. 4 is a side elevation view in section of the subject optical detector assembly subsequent the crimping operation.

Referring to FIGS. 8-12, a background of the principles of the present invention will be diagrammatically given as a preface to the succeeding description of the preferred embodiment. A two waveguide optical detector configuration is depicted in Model-1 of FIG. 8 and in accordance with the principles of the present invention comprises a single transmitting waveguide 10 and a single receiving waveguide 12 arranged in an axially adjacent relationship. Each waveguide 10, 12 has an end surface 14, 16, respectively, positioned parallel and spaced from a surface referenced as the X-axis by a distance Y. The index of refraction for the transmitting waveguide 10 is $N_1$, and for the external medium is $N_2$. Representative paths of transmitted light are further illustrated as $\theta_n$, $\theta_{3\,dB}$, and $\theta_{10\,dB}$, and it should be noted that $N_1$, the 3 decibel loss angle $\theta_{3\,db}$, and the 10 decibel loss angle $\theta_{10\,db}$ are all parameters of the waveguide chosen. For the waveguide selected as an example:

$N_1 = 1.5$;

the 3 decibel angle $\theta_{3\,db} = 10°$; and
the 10 decibel angle $\theta_{10\,db} = 21°$.

It will be recognized from FIG. 8 that as light travels through the end surface 14 of the transmitting waveguide 10, refraction occurs bending the non-normal $\theta_{3\,db}$, $\theta_{10\,db}$ paths toward the receiving waveguide interface 17. According to Snell's Law, the relationship between the angle $\theta$ of light approaching the end surface 14 and the angle $\theta''$ of light leaving the end surface 14 is described by the equation:

$$\sin \theta'' = \frac{N_1 \sin \theta}{N_2}, \text{ with } N_2 = 1.0 \text{ for air.}$$

If X is the distance from the waveguide interface on the receiving waveguide, and Y is the distance to the X-axis surface set at 0.01 inches, than a statement of X in terms of Y would be: $X = Y \tan \theta''$; and $X_n = 0$, $X_{3\,db} = 0.0026$, and $X_{10\,dB} = 0.0064$.

That is, transmitted light with 3 decibel loss would be focused to a detection zone 0.0026 inches across the subject surface here represented as the X-axis. Also, as illustrated by the shaded illumination pattern 18 of FIG. 8, the illuminating light is distributed unequally along the X-axis in the detection zone. This serves to reduce the detection zone to an area less than the diameter of the receiving waveguide 12. It is assumed that reflected light, referenced $\theta_r$, is substantially normally reflected from the horizontal X-axis, and while the validity of this assumption could change depending on the reflective characteristics of a given surface, such a change would not affect the validity of the teachings of the present invention.

Referring now to FIG. 9, a Model-2 optical two waveguide detector is illustrated in accordance with the present invention, with waveguide end surfaces 14, 16 having an angle polish of prescribed degree. The effective angle $\theta'$ of light approaching the end surface 14 is:

$$\theta' = \theta + 10°.$$

With the waveguide parameters of Model-2 the same as Model-1, and with the distance Y from the surface taken at the waveguide interface remaining at 0.01 inches, the following relationships hold true:

$$\sin \theta'' = \frac{N_1 \sin \theta'}{N_2} \text{ where } \theta' = \theta + 10°;$$

and substituting waveguide parameters for $\theta_n$, $\theta_{3\,dB}$, $\theta_{10\,dB}$, and $N_1$:
$\theta''_n = 15.1°$ $\theta''_{3\,dB} = 30.9°$
$\theta''_{10\,dB} = 50.6°$
Since
$X = Y \tan \theta''$
$X_n = 0.0027$ inches
$X_{3\,dB} = 0.006$ inches
$X_{10\,dB} = 0.0122$ inches It should be noted that the angle of polish must be below $\theta_{3\,dB}$, otherwise the refractive loss of the receiving waveguide will counteract the benefits of the increased surface illumination. With the transmitting/receiving waveguides reversed, however, this refraction is beneficial. Comparing Model-2 with Model-1, it can be seen that an angular polish serves, through increased refraction, to increase the total illumination within the $X_{3\,dB}$ detection zone and also to increase the distance $X_{3\,dB}$ from 0.0026 for Model-1 to 0.006 for Model-2. The increased illumination in Model-2 is beneficial in improving the detection performance of the two-waveguide detector and the unequal light distribution along the X-axis achieved by both Model-1 and Model-2 acts to reduce the detection zone to an area less than the diameter of the receiving waveguide. In short, the angularly polished Model-2 detector results in increased total illumination in the $X_{3\,dB}$ detection zone over the flat polished detector of Model-1, however, both Model-1 and Model-2 increase resolution by reducing the $X_{3\,dB}$ detection zone to an area less than the diameter of the receiving waveguide. Having a detection zone reduced to an area less than the diameter of the receiving waveguide increases the definition or resolution of the detected image in the surface detection zone by eliminating extraneous fringe light reflected from the surface areas outside of the detection zone.

Referring to FIGS. 10 and 10A, for the purpose of comparison a Model-3 optical detector assembly is shown comprising multiple transmitting waveguides 20, 22 and a single receiving waveguide 24 interposed therebetween. The waveform 26 of illuminating light is indicated by shading in FIG. 10 with extreme points $X_1$ and $X_{11}$ indicated for general comment. The Model-2 illumination waveform 28 and detector assembly are shown in FIGS. 11 and 11A with corresponding points $X_1$ and $X_{11}$ likewise indicated in FIG. 11. It will be readily apparent that the illumination pattern 26 for the Model-3 assembly illustrated in FIGS. 10 and 10A is the superimposed composite of two of the Model-2 detector assembly illumination patterns 28 shown in FIGS. 11 and 11A. It further will be apparent that, for Model-3, the illumination at $X_1$ is equal the illumination at $X_{11}$, while for Model-2 the illumination at $X_1$ is less than the illumination at $X_{11}$. In summary, Model-3 puts more light underneath the receiving waveguide than Model-2 and distributes it evenly. This model therefore is better suited for applications where redistribution of filtering of the spectral content of the light is required; i.e., color detection. However for high resolution applications, Model-2 is best suited because, as previously mentioned, the unequal light distribution along a single axis acts to reduce the detection zone to an area less than the diameter of available receiving waveguides. This difference is graphically illustrated by the shaded effective 3 dB area 28 of Model-2 in FIG. 11A contrasted against the entire illuminated area of Model-3 in FIG. 10A.

There is, therefore, a performance tradeoff between illumination and resolution. Model-3 delivers greater illumination than either Model-2 or Model-1, but Model-2 and Model-1 achieve greater resolution than Model-3. The angularly prepared Model-2 is an optimal compromise since it optimizes illumination through increased refraction, yet preserves high resolution by the unequal distribution of illumination across a detection zone having an area less than the receiving waveguide. Further, the above optimization is achieved without sacrifice of the easily manufacturable two waveguide transmitting/receiving assembly configuration.

The preferred embodiment of the principles of the instant invention is illustrated in FIGS. 1-7. With reference first to FIGS. 1 and 2, each optical detector assembly 30 is shown to comprise a generally tubular profiled resilient housing 32 and a crimping ring member 34. The housing 32 includes a nose portion 36, a neck portion 38 having a longitudinal orientation flange 40 extending the external length thereof, and a rearward portion 42 integrally contiguous the neck portion 38. A bore 44 is provided in the housing 32 extending from a rearward housing surface 46 to a forward housing surface 48 and having an enlarged rearward opening 50 at the rearward housing surface 46. The bore 44 is profiled and dimensioned for closely receiving a transmitting waveguide 52 and a receiving waveguide 54 therein. The transmitting waveguide 52 and receiving waveguide 54 extend forward from an outer sheath 56 and each waveguide 52, 54 has a forward end surface 58, 60, respectively. The crimping ring member 34 is dimensioned having an inner diameter slightly greater than the nose portion 36 of the housing 32.

Assembly of the subject optical detection assembly, illustrated by FIGS. 2 and 3, is initiated by the introduction of a small amount of epoxy 62 or like adhesive material into the bore 44. The crimping ring member 34 is closely mounted over the housing nose portion 36 in abuttment against the orientation flange 40, and the waveguides 52, 54 are subsequently inserted into the bore 44 as shown by FIG. 3. The enlarged opening 50 of the bore 44 accommodates limited entry of a forward end of the sheath 56, and the waveguides 52, 54 extend sufficiently forward free of the sheath 56 to protrude slightly beyond the forward end surface 48 of the housing 32.

Figure 6:
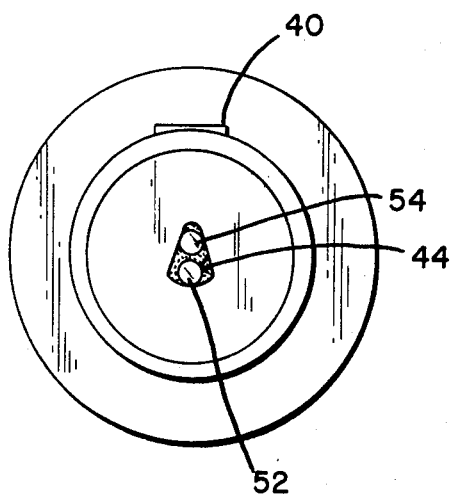
FIG. 6 is a frontal view of the subject optical detector assembly taken along the line 6—6 of FIG. 3.
Figure 7:
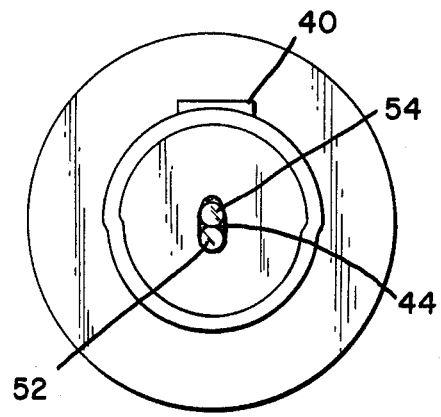
FIG. 7 is a frontal view of the subject optical detector assembly taken along the line 7—7 of FIG. 4.

It will be appreciated from FIG. 6 that the bore 44 is profiled to be of generally triangular section, with the apex of the triangular section oriented toward the orientation flange 40. For assembly of the present invention, it is contemplated that the waveguides be inserted into the bore 44 so that the receiving waveguide 54 is oriented closest the orientation flange 40 for a purpose explained below. As shown by FIGS. 4 and 7, the crimping ring member 34 is subsequently crimped and exerts a radial compressive force on the housing nose portion 36 and the waveguides extending therethrough. The crimping procedure can be performed by any standard crimping tool (not shown) commonly available in the industry. As the epoxy 62 within the bore 50 cures, the waveguides are thereby fixedly secured within the bore 44 with the receiving waveguide 54 fixedly referenced to the orientation flange 40.

Figure 5:
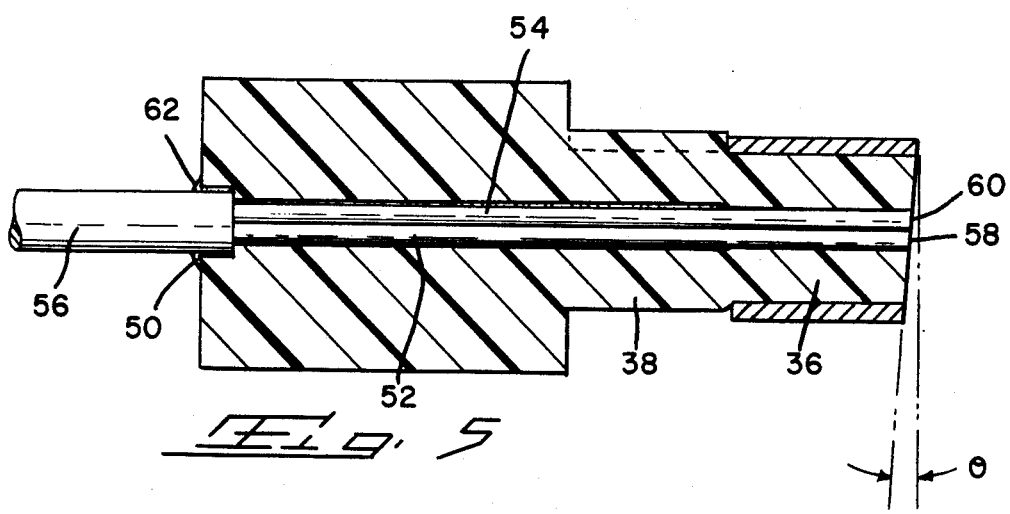
FIG. 5 is a side elevation view in section of the subject optical detector assembly subsequent the end preparation operation.

With the receiving waveguide referenced as described above, the next step in the assembly procedure is end preparation of the waveguide end surfaces 58, 60 and resilient housing end surface 48. The waveguide end surfaces and the housing end surface are simultaneously polished to a prescribed angle $\theta$ as shown in FIG. 5, with the polishing being done evenly to all surfaces. It has been empirically determined that improved resolution is achieved by angular end preparation, with optimal results obtained where $\theta$, the angle of polish, is within the 8 to 10 degree range. It should be noted that the angled preparation is done in a direction so that the receiving end surface 60 extends forward beyond the forward end surface 58 of the transmitting waveguide 52. The correct forwardmost extending position of the receiving waveguide end surface 60 relative the transmitting waveguide end surface 58 is assured if the angle of preparation is referenced from the orientation flange 40. This is because the receiving waveguide has been fixedly pre-referenced within the bore 44 to be closest the orientation flange 40 as described above.

The assembly detector assembly is shown in FIGS. 1 and 5. The subject detector assembly is intended for use in detecting markings 64 encoded on a card surface 66 or the like, or in detecting images for facsimile reproduction. It will be appreciated by those skilled in the art that the instant invention could be stationarily mounted above the surface 64 with the card 66 passed regularly therebeneath, or the instant invention could be utilized as a light-pen and manually passed across the surface 66 by the user. As shown in FIG. 1, the optical detector assembly is to be positioned normally above the encoded surface 66 with a forwardmost edge of the optical assembly either contacting or closely proximate the surface 66 depending on the angle of end preparation. That is, by selectively varying the angle of end preparation of the assembly within the preferred range specified above, the desired distance separation between the angled waveguide end surfaces and the encoded surface can be established if the leading edge of the assembly contacts the encoded surface with the waveguides maintained in normal relationship to the encoded surface. There positioned, light transmitted through the transmitting waveguide is refracted at the transmitting waveguide end surface and directed to a detection zone of the encoded surface substantially beneath the receiving waveguide end surface. The detection zone has an area less than that of the receiving waveguide end surface as described above, and the light incident of the detection zone is unequally distributed along a single axis. The incident light is reflected from reflective regions of the detection zone to the receiving waveguide end surface where, with refraction, the light enters the receiving waveguide and is returned to photo-responsive interpretation circuitry.

While the above description of the preferred embodiment exemplifies the principles of the subject invention, other embodiments which will be apparent to one skilled in the art and which utilize the teachings herein set forth are intended to be within the scope and spirit of the subject invention.

What is claimed is:

1. In an optical detection assembly for detecting light-dark variations in an encoded surface or the like, of the type having transmitting waveguide means for directing light transmitted therethrough toward the encoded surface, receiving waveguide means receiving light reflected back from the encoded surface, and housing means holding said waveguides in a fixed relationship, the improvement comprising:

said transmitting waveguide means comprising a remote end of a first optical waveguide;

said receiving waveguide means comprising a remote end of a second optical waveguide disposed axially adjacent said transmitting waveguide remote end, with said transmitting and receiving waveguide remote ends having end surfaces lying in a common plane and prepared at a common prescribed refraction angle so that said receiving waveguide end surface extends forward of said transmitting waveguide end surface at said prescribed angle, whereby upon positioning said transmitting and receiving waveguide angled end surfaces above the encoded surface with said waveguides axially perpendicular to the surface, light transmitted through said angled transmitting waveguide end surface is refracted toward the receiving waveguide interface, and illuminates a detection zone of the encoded surface generally beneath said receiving waveguide with an intensity of illumination variable across said detection zone.

2. The optical detector assembly according to claim 1 wherein said housing means comprises:
   a resilient body having a bore therethrough profiled for receiving said transmitting and receiving waveguides therethrough in an oriented relationship.

3. The optical detection assembly according to claim 2 wherein a forward alignment face of said resilient body is coplanarly angled with said angled waveguide end surfaces.

4. The optical detection assembly according to claim 3 wherein said housing means further comprises adhesive means within said bore and means for radially compressing a nose portion of said resilient body proximate said alignment face to secure said waveguide remote ends within said bore.

5. In an optical detection assembly for detecting light-dark variations in an encoded surface or the like, of the type having transmitting waveguide means for directing light transmitted therethrough toward the encoded surface, receiving waveguide means receiving light reflected back from the encoded surface, and housing means holding said waveguides in a fixed relationship, the improvement comprising:
   said transmitting waveguide means comprising a remote end of a first optical waveguide;
   said receiving waveguide means comprising a remote end of a second optical waveguide;
   said housing means comprising a resilient ferrule having a bore therethrough profiled for receiving said waveguide remote ends therein with waveguide end surfaces and a forward face of said ferrule being prepared at a common prescribed angle so that said receiving waveguide end surface extends forward of said transmitting waveguide end surface at said common prescribed angle,
   adhesive means for securing said waveguide remote ends within said ferrule bore, and
   crimping means for radially compressing a forward nose portion of said ferrule to fixedly orient said waveguides within said bore.

6. The method of assembly an optical waveguide detector assembly of the type comprising a transmitting waveguide for transmitting light to an encoded surface or the like, and a receiving waveguide for receiving light reflected from the encoded surface, comprising the steps of:
   inserting forward ends of said waveguides through bored resilient body means having adhesive means within said bore;
   positioning the end surfaces of said waveguides substantially coplanar with a forward face of said resilient body means,
   crimping a forward portion of said resilient body means with crimping means;
   polishing said waveguide end surfaces and said forward face of said resilient body means at a prescribed angle so that said receiving waveguide end surface extends forward of said transmitting waveguide end surface at said prescribed angle.

* * * * *